US011955111B2

(12) United States Patent
Yamada et al.

(10) Patent No.: US 11,955,111 B2
(45) Date of Patent: Apr. 9, 2024

(54) LEARNING DATA GENERATION DEVICE, LEARNING DATA GENERATION METHOD AND NON-TRANSITORY COMPUTER READABLE RECORDING MEDIUM

(71) Applicant: NIPPON TELEGRAPH AND TELEPHONE CORPORATION, Tokyo (JP)

(72) Inventors: Setsuo Yamada, Tokyo (JP); Yoshiaki Noda, Tokyo (JP); Takaaki Hasegawa, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 441 days.

(21) Appl. No.: 17/268,469

(22) PCT Filed: Aug. 14, 2019

(86) PCT No.: PCT/JP2019/031929
§ 371 (c)(1),
(2) Date: Feb. 14, 2021

(87) PCT Pub. No.: WO2020/036188
PCT Pub. Date: Feb. 20, 2020

(65) Prior Publication Data
US 2021/0183369 A1 Jun. 17, 2021

(30) Foreign Application Priority Data

Aug. 15, 2018 (JP) ................................. 2018-152889

(51) Int. Cl.
*G10L 15/06* (2013.01)
*G06N 20/00* (2019.01)
(Continued)

(52) U.S. Cl.
CPC ............ *G10L 15/063* (2013.01); *G06N 20/00* (2019.01); *G10L 15/197* (2013.01); *G10L 15/22* (2013.01)

(58) Field of Classification Search
CPC ... G10L 15/22; G10L 15/1822; G10L 15/063; G10L 15/26; G06N 20/00
See application file for complete search history.

(56) References Cited

U.S. PATENT DOCUMENTS 8,447,608 B1 * 5/2013 Chang .................. G10L 15/197
704/9
10,963,819 B1 * 3/2021 Gangadharaiah ...... G06N 3/044
(Continued)

OTHER PUBLICATIONS

Fan et al. (2008) "LIBLINEAR: A Library for Large Linear Classification," Journal of Machine Learning Research vol. 9, pp. 1871-1874.
(Continued)

*Primary Examiner* — Mark Villena

(57) ABSTRACT

To improve prediction accuracy of utterance types in a dialog. A learning data generation device (10) according to the present invention comprises: a sort unit (11) configured to perform, based on information appended to utterances in a dialog amongst more than one speaker and that is indicative of a dialogue scene that is a scene in which the utterances in the dialog were made, sorting regarding whether the utterances are to be targets for generation of the learning data, wherein the sorter (11) is configured to exclude utterances of a dialogue scene that includes utterances similar to utterance of the particular type from the targets for generation of learning data.

12 Claims, 10 Drawing Sheets

(51) Int. Cl.
*G10L 15/197* (2013.01)
*G10L 15/22* (2006.01)

(56) References Cited

U.S. PATENT DOCUMENTS

2018/0301151 A1* 10/2018 Mont-Reynaud ....... G10L 15/22
2019/0251165 A1* 8/2019 Bachrach ............... G06N 3/084

OTHER PUBLICATIONS

Tsuboi et al. (2017) "Natural language processing by deep learning," Published by Kodansha Co., Ltd., pp. 32-37.

* cited by examiner

FIG. 2

| UTTERANCE TYPE OF PREDICTION TARGET | DIALOGUE SCENE INCLUDING UTTERANCE HAVING THE UTTERANCE TYPE OF THE PREDICTION TARGET | DIALOGUE SCENE INCLUDING UTTERANCE HAVING AN UTTERANCE TYPE SIMILAR TO THAT OF THE PREDICTION TARGET | DIALOGUE SCENE NOT INCLUDING UTTERANCE HAVING AN UTTERANCE TYPE SIMILAR TO THAT OF THE PREDICTION TARGET |
|---|---|---|---|
| TOPIC UTTERANCE | INQUIRY UNDERSTANDING | RESPONSE | CONTRACT CONFIRMATION |
| REGARD UTTERANCE | INQUIRY UNDERSTANDING | RESPONSE | CONTRACT CONFIRMATION |
| REGARD CONFIRMATION UTTERANCE | INQUIRY UNDERSTANDING | RESPONSE/CONTRACT CONFIRMATION | N/A |
| CONTRACT CONFIRMATION UTTERANCE | CONTRACT CONFIRMATION | RESPONSE/INQUIRY UNDERSTANDING | N/A |
| CONTRACT RESPONSIVE UTTERANCE | CONTRACT CONFIRMATION | RESPONSE/INQUIRY UNDERSTANDING | N/A |

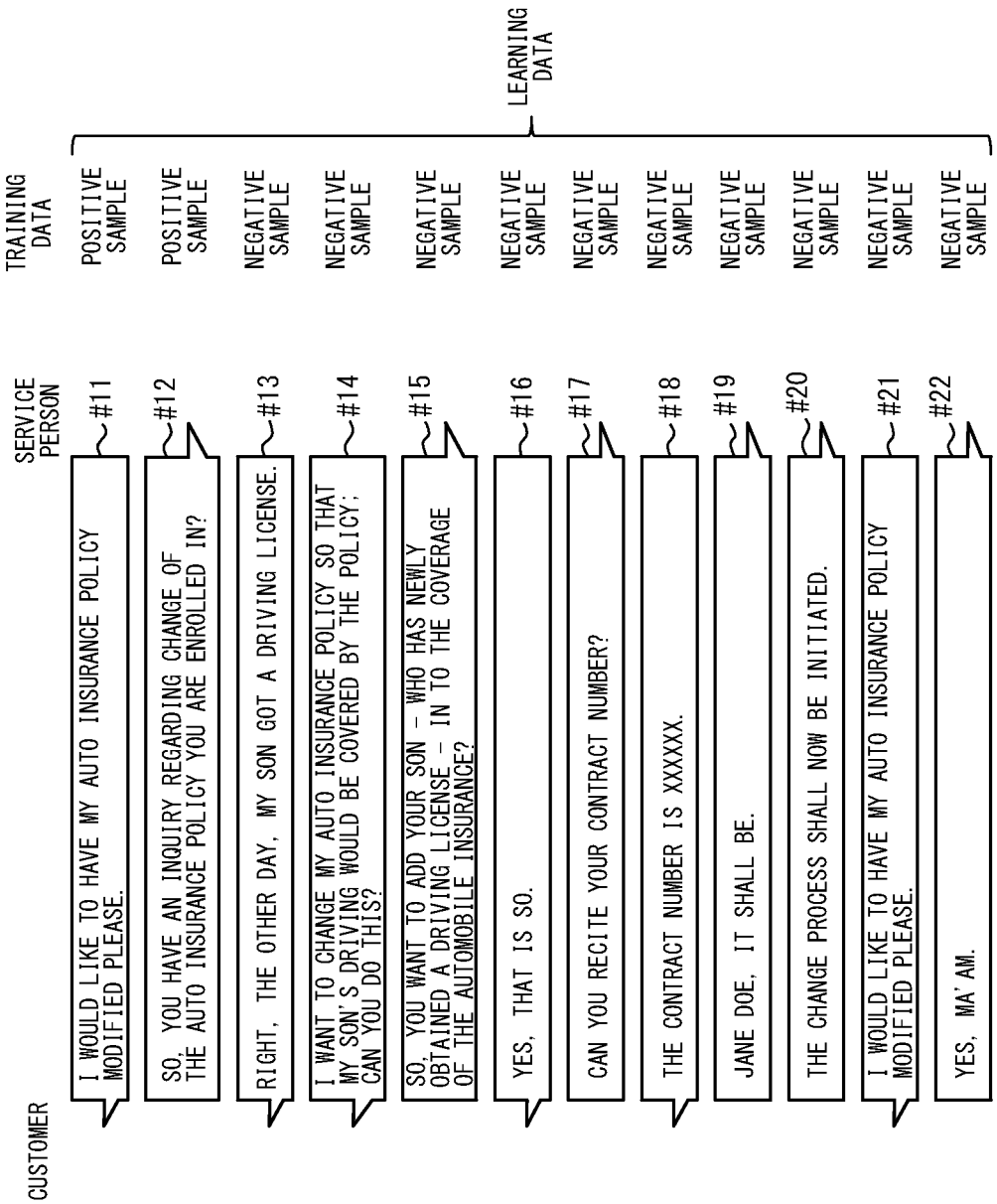

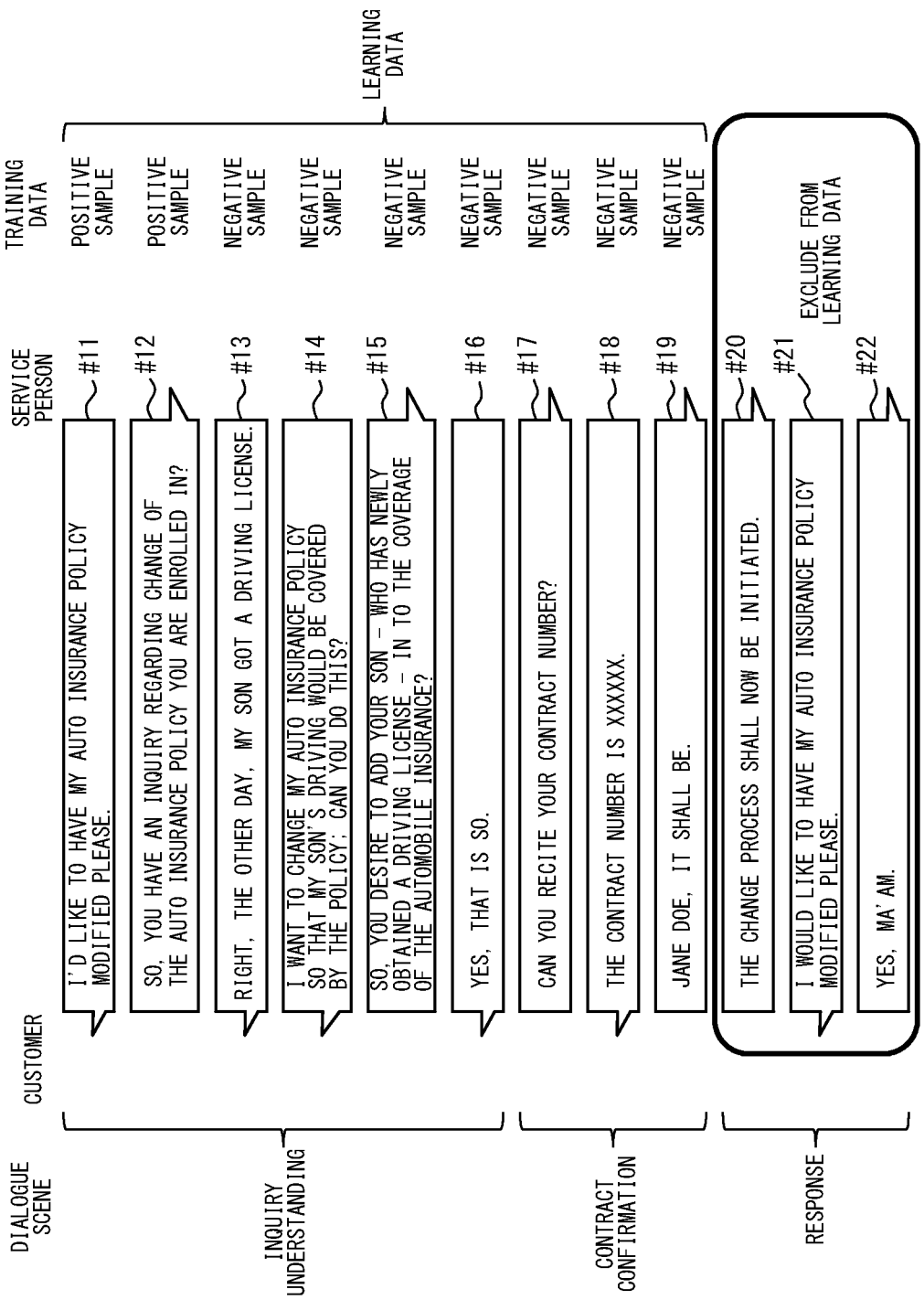

FIG. 6

| UTTERANCE TYPE | DIALOGUE SCENE SUBJECTED TO PREDICTION | DIALOGUE SCENE NOT SUBJECTED TO PREDICTION |
|---|---|---|
| TOPIC UTTERANCE | INQUIRY UNDERSTANDING | RESPONSE, CONTRACT CONFIRMATION, OPENING, CLOSING |
| REGARD UTTERANCE | INQUIRY UNDERSTANDING | RESPONSE, CONTRACT CONFIRMATION, OPENING, CLOSING |
| REGARD CONFIRMATION UTTERANCE | INQUIRY UNDERSTANDING | RESPONSE, CONTRACT CONFIRMATION, OPENING, CLOSING |
| CONTRACT CONFIRMATION UTTERANCE | CONTRACT CONFIRMATION | RESPONSE, INQUIRY UNDERSTANDING, OPENING, CLOSING |
| CONTRACT RESPONSIVE UTTERANCE | CONTRACT CONFIRMATION | RESPONSE, INQUIRY UNDERSTANDING, OPENING, CLOSING |

FIG. 7

| DIALOGUE SCENE | UTTERANCE TYPE OF PREDICTION TARGET |
|---|---|
| INQUIRY UNDERSTANDING | TOPIC UTTERANCE |
| | REGARD UTTERANCE |
| | REGARD CONFIRMATION UTTERANCE |
| CONTRACT CONFIRMATION | CONTRACT CONFIRMATION UTTERANCE |
| | CONTRACT RESPONSIVE UTTERANCE |
| RESPONSE | N/A |

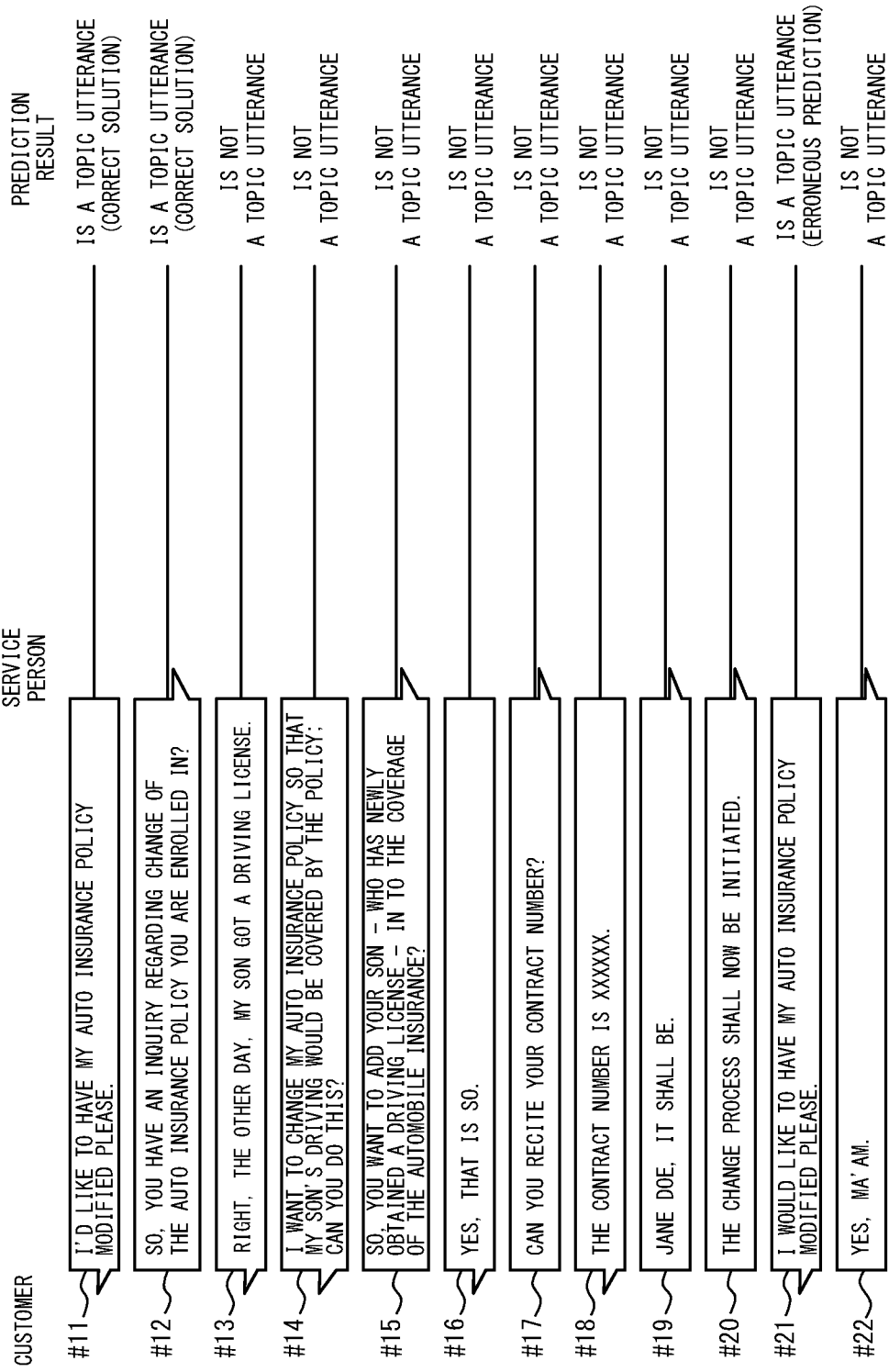

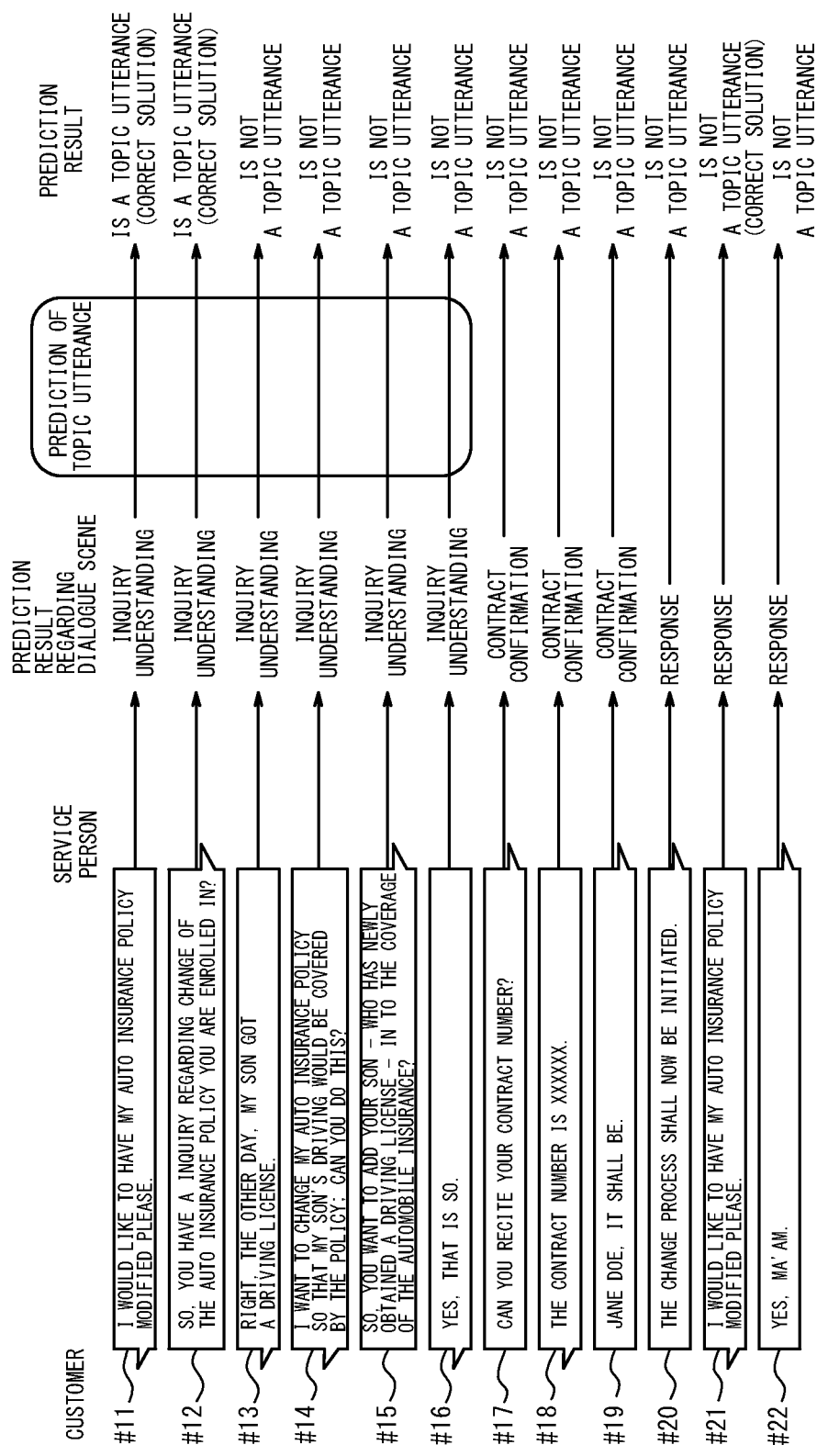

LEARNING DATA GENERATION DEVICE, LEARNING DATA GENERATION METHOD AND NON-TRANSITORY COMPUTER READABLE RECORDING MEDIUM

CROSS-REFERENCE TO RELATED APPLICATIONS

This application is a U.S. 371 Application of International Patent Application No. PCT/JP2019/031929, filed on 14 Aug. 2019, which application claims priority to and the benefit of JP Application No. 2018-152889, filed on 15 Aug. 2018, the disclosures of which are hereby incorporated herein by reference in their entireties.

TECHNICAL FIELD

The present invention relates to a learning data generation device, and method and program for generating learning data to be used for generating a prediction model for predicting whether an utterance in a dialog amongst more than one speaker is of a particular utterance type.

BACKGROUND

For example, from dialogs between a customer and service person in a contact center, it is desirable to create and manage a dialogue history. In order to create such a dialogue history, it is important to extract the focus points from utterances in the dialog, and in order to extract the focus points from the utterances, it is important to predict the type of the utterances (hereinafter, "utterance type").

One method for predicting utterance type is a method that uses a prediction model to predict whether an utterance is an utterance of a particular utterance type. Such a prediction model may be created by preparing learning data to which training data training data is appended, the training data indicating whether, with respect to an utterance, the utterance is an utterance of a particular type, and by machine learning using the learning data (see, NPL 1 and NPL 2).

For example, when creating a prediction model for topic utterances pertaining to topics of dialogs, learning data to which training data is appended is prepared, the training data indicating whether, with respect to an utterance, the utterance is a topic utterance, and a prediction model for topic utterances can be created via machine learning using the learning data.

CITATION LIST

Non-Patent Literature

NPL 1: R.-E. Fan, K.-W. Chang, C.-J. Hsieh, X.-R. Wang, and C.-J. Lin. LIBLINEAR: A library for large linear classification Journal of Machine Learning Research 9 (2008), 1871-1874.

NPL 2: Y. Tsuboi et al., "Natural Language Processing by Deep Learning", Kodansha, May 24, 2017, pp. 32-36.

SUMMARY

Technical Problem

In the past, it was common practice to manually perform the abovementioned appending of training data. For example, when a prediction model for topic utterances is to be created, with respect to utterances in a dialog, data indicating whether utterances are topic utterances was performed by workers.

For example, in dialogs between a customer and a service person in a contact center, even if utterances are similar, the utterance types may be different depending on the scene of the dialog in which the each utterance was made (hereinafter, "dialogue scene"). Conventionally, in a case in which appending of training data is performed manually, the worker may, taking into consideration the preceding and succeeding utterance contexts and the like, append, with respect to similar utterances, different training data. For example, with respect to a certain utterance, training data indicating that the utterance is a topic utterance is appended, and for another utterance similar to said utterance, training data indicating that the other utterance is not a topic utterance may be appended. When a prediction model is created using learning data to which different training data regarding similar utterances is appended, there is a problem in that the prediction accuracy is degraded.

An objective of the present invention, conceived in view of abovementioned problems, is to provide a learning data generation device, a learning data generation method and a program that can improve the prediction accuracy of utterance types in a dialog.

Solution to Problem

In order to solve the abovementioned problems, the learning data generation device pertaining to present invention is a learning data generation device for generating learning data for use in creation of a prediction model for predicting whether an utterance in a dialog amongst more than one speaker is an utterance of a particular type, the learning data generation device comprising: a sorter configured to perform, based on information appended to utterances in a dialog amongst more than one speaker and that is indicative of a dialogue scene that is a scene in which the utterances in the dialog were made, sorting regarding whether the utterances are to be targets for generation of the learning data, wherein the sorter is configured to exclude utterances of a dialogue scene that includes utterances similar to utterance of the particular type from the targets for generation of the learning data.

Further, in order to solve abovementioned problems, the learning data generation method pertaining to present invention is a learning data generation method for generating learning data for use in creation of a prediction model for predicting whether an utterance in a dialog amongst more than one speaker is an utterance of a particular type, the learning data generation method comprising: a sorting step of performing, on the basis of information appended to utterances in a dialog amongst more than one speaker and that is indicative of a dialogue scene that is a scene in which the utterances in the dialog were made, sorting regarding whether the utterances are to be targets for generation of the learning data, wherein the sorting step excludes utterances of a dialogue scene that includes utterances similar to utterance of the particular type from the targets for generation of the learning data.

Further, to solve abovementioned problems, the program pertaining to present invention causes a computer to function as the abovementioned learning data generation device.

Advantageous Effect

According to the learning data generation device, the learning data generation method and the program according to the present invention, the prediction accuracy of utterance types in a dialog can be improved.

BRIEF DESCRIPTION OF THE DRAWINGS

In the accompanying drawings:

FIG. 2 is a diagram illustrating an example of learning target definitions for each utterance type learning retained by the sorter shown in FIG. 1;

FIG. 3 is a diagram for explaining conventional generation of learning data;

FIG. 4 is a diagram for explaining generation of learning data according to the learning data generation device of FIG. 1;

FIG. 6 is diagram illustrating example sort definitions stored by a sort definition store shown in FIG. 5;

FIG. 7 is a diagram illustrating example utterance type definitions to be prediction targets for each dialogue scene that are retained by an utterance type prediction device of FIG. 5;

FIG. 9 is a diagram illustrating examples of conventional prediction of utterance type; and FIG. 10 is a diagram illustrating examples of utterance type prediction according to the utterance type prediction device of FIG. 5.

DETAILED DESCRIPTION

Figure 1:
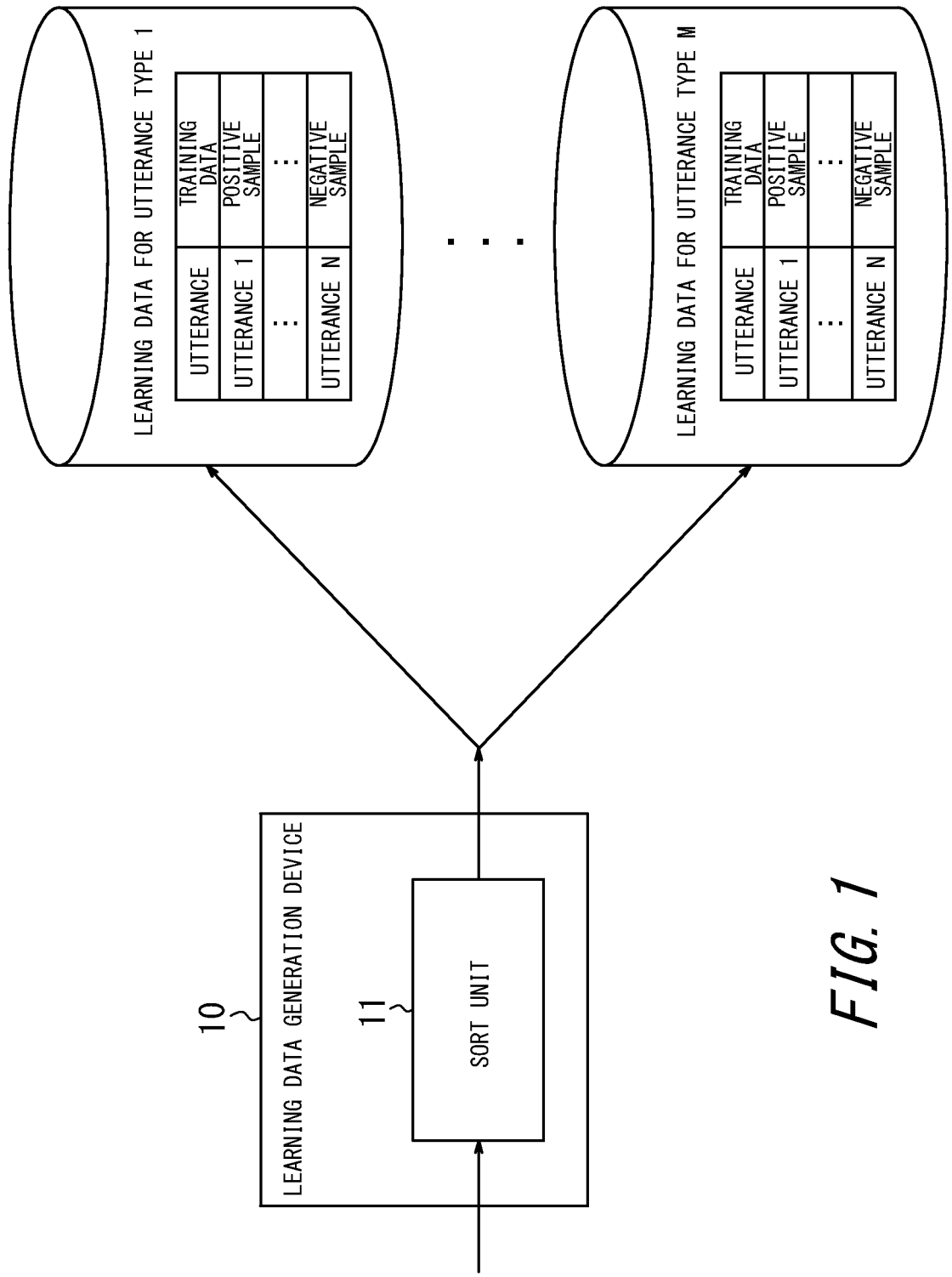
FIG. 1 is a schematic diagram illustrating an example configuration of the learning data generation device according to an embodiment of present invention.

Hereinafter, embodiments of the present invention will be described with reference to the drawings. In each of the diagrams, the same reference numerals indicate the same or equivalent constituent elements.

FIG. 1 is a schematic diagram illustrating an example of a configuration of a learning data generation device 10 according to an embodiment of present invention. The learning data generation device 10 according to the present embodiment is for generating learning data to be used for the creation of prediction models for predicting whether an utterance in a dialog amongst more than one speaker is an utterance of a particular utterance type.

The learning data generation device 10 of FIG. 1 comprises a sort unit 11.

The results of speech recognition (text-converted utterances) of the utterances, to which information indicating a dialogue scene is appended, are inputted to the sort unit 11. The dialogue scene of an utterance refers to, with respect to an utterance in a dialog amongst more than one speaker, the scene in which said utterance was made. For example, taking as an example the dialog between a customer and a service person in a contact center, various situations are possible as dialogue scenes, such as "opening" in which the initial greetings and the like are spoken, "inquiry understanding" in which the inquiry content of the customer is acquired, "contract confirmation" in which it is ascertained that the customer is a party to the contract and in which the contract content is confirmed, "response" in which answers and responses to the inquiry content are provided to the customer, "closing" in which concluding salutations and the like are spoken, and other such situations. Information indicating dialogue scenes are, for example, appended by workers.

In speech recognition, should a silent interval persist for a prescribed time or longer, the utterance following the final utterance of the previous speech recognition processing unit but preceding that silent interval is subjected, as one processing unit, to speech recognition, and the speech recognition result (hereinafter, "speech recognition result unit") is outputted. Information indicating a dialogue scene is, for example, appended to each of the speech recognition result units.

Further, within a speech recognition result unit, end-of-talks in which the speaker has finished conveying the intended content may exist. As stated above, in speech recognition, processing units are determined when a silent interval persists for a prescribed time or longer. Here, for example, when the speaker, after having finished speaking about certain content, starts speaking about different content without leaving an interval, speech recognition is performed on the processing unit that includes the end-of-talk regarding the abovementioned certain topic and, as a result, the end-of-talk utterance is included in the speech recognition result unit. Thus, the end-of-talk utterance in the speech recognition result unit may be detected, and dialogue scene information may be appended to the end-of-talk unit from the preceding end-of-talk utterance up until the detected end-of-talk utterance.

The detection of end-of-talk utterances in the speech recognition result unit can, for example, be performed by using a determination model for determining whether an utterance corresponding to a partitioned string is an end-of-talk utterance, said string being partitioned by punctuation in a string that is text converted via speech recognition performed on utterances. Such a determination model can be created via machine learning using learning data to which training data indicating whether utterances are end-of-talk utterances are appended, in respect of utterances corresponding to partitioned strings that are partitioned by punctuation in a string that is text converted from utterances, and utterances corresponding to strings sequenced according to an utterance order from consecutive partitioned strings.

For example, as a method for appending punctuation in speech recognition, when a silent interval persists for a prescribed time that is shorter than the silent interval set in order to demarcate the abovementioned processing units, punctuation may be placed at the position corresponding to that silent interval. Whether a comma or a period is to be placed is decided appropriately on the basis of prior and subsequent contexts and the like. For example, Reference 1 describes a method for automated insertion of punctuation into speech recognition results. Specifically, Reference 1 recites methods for inserting punctuation on the basis of words (manifested forms), parts of speech, segment boundaries, modification information for immediately succeeding segments, and pauses and the like. Moreover, after the cessation of speaking of a certain speaker, should a different speaker initiate speaking prior to passage of a silent interval on which the determination of a placement of punctuation is conditioned, punctuation may not be appended to the end of the speech recognition result of the utterances of the earlier speaker. It is also possible to make it such that the appending of punctuation to the end of speech recognition results compulsory.

Reference 1: Y. Akita and T. Kawahara, "Automatic Insertion Based on Multiple Annotations of Commas for Lectures", Journal of Information Processing Society of Japan, 1882-7765, No. 54, Vol. 2, 2013.

Further, utterances of each of the more than one speaker are split into different channels and speech recognition is performed. Then, by determining whether speaker turn taking has happened, it can be determined whether speech has been terminated. For example, in a dialog between a customer and a service person, a common dialog-construction is one in which, after the customer finishes voicing inquiry content, the service person provides an answer in response to that inquiry, and after the service person finishes voicing the answer, the customer makes a further inquiry. That is to say, when speaker turn taking happens, there is a tendency for the utterance immediately prior to that speaker turn taking to be an end-of-talk utterance of the speaker prior to the speaker turn taking. Thus, the end-of-talk unit may be set as the utterances on and after the previous speaker turn taking up to the utterance immediately prior to the current speaker turn taking, and information indicating the dialogue scene may be appended according to this end-of-talk unit.

The sort unit 11 performs, on the basis of information appended to utterances and indicative of dialogue scenes, sorting regarding whether those utterances that are targets for generation of learning data. Here, the sort unit 11 excludes, from the targets for generation of the learning data, utterances for dialogue scenes that include (possibly include) utterances similar to utterances of a particular type (utterances of utterance types to be subjected to predicting). By excluding, from the targets for generation of the learning data, utterances for the dialogue scenes that include utterances similar to the utterances of a particular type, generation of learning data to which differing training data is appended is no longer generated. As a result, the prediction accuracy of a prediction model created using such learning data can be improved.

Further, the sort unit 11 may extract utterances of dialogue scenes that include (possibly include) utterances of a particular type as targets for generation of learning data. With respect to the extracted utterances, for example, training data indicating whether a positive sample (i.e. an utterance of the particular type) or a negative example (i.e. not an utterance of the particular type) is appended by a worker to generate the learning data. The generated learning data is stored and used for the creation of a prediction model for the particular type.

Further, the sort unit 11 may, with respect to utterances for dialogue scenes that do not include utterances similar to utterances of the particular type, generate learning data to which training data indicating that the utterance is not the particular utterance type is appended. By doing so, with respect to the utterances, it is possible to automatically generate learning data to which utterances that are not of the particular type, i.e. negative-sample-training data, is appended. Further, the sort unit 11 may exclude utterances of dialogue scenes that do not include utterances similar to utterances of the particular type from the targets for generation of the learning data. Whether utterances of dialogue scenes that do not including utterances similar to utterances of the particular type are used as negative samples or are excluded from the targets for generation of learning data can be set as a predetermined setting, at the time of learning, that adjusts such that the ratio of positive samples to the ratio of negative samples is the same, for example.

The sort unit 11 performs the abovementioned processing for each utterance type of the prediction targets (utterance types 1 through m). By doing so, learning data for the creation of prediction models for each utterance type is generated and stored.

Next, sorting according to dialogue scene, performed by the sort unit 11, is explained in more detail. A dialog between a customer and a service person in a contact center is given as an example below. Further, as the dialogue scenes, "inquiry understanding" in which the inquiry content of the customer is acquired, "contract confirmation" in which it is ascertained that the customer is a party to the contract and in which the contract content is confirmed, and "response" in which answers and responses to the inquiry content are provided to the customer, are given as examples. Further, as the utterance types of the prediction targets, topic utterances pertaining to topics of the dialog, regard utterances indicative of the regard of the regard content of the customer, regard confirmation utterances confirming the regard of the customer, contract confirmation utterances confirming contract content of the customer, contract response utterances pertaining to responses to contract content confirmation, and response utterances pertaining to responses to the regard of the customer, are given as examples.

The sort unit 11 retains learning target definitions for each utterance type and performs sorting based on the definitions. FIG. 2 is a diagram illustrating examples of learning target definitions for each utterance type as retained by the sort unit 11.

As shown in FIG. 2, the sort unit 11 retains, for each utterance type of the prediction targets, definitions prescribing dialogue scenes that include utterances having the utterance type of the prediction target, dialogue scenes that include (possibly include) utterances similar to utterances of utterance types of the prediction target and dialogue scenes that do not include utterances similar to utterances of utterance types of the prediction target. On the basis of these definitions, the sort unit 11 performs sorting to classify whether the utterances each of the dialogue scenes are to be targets for generation of learning data.

For example, in a case in which the utterance type of the prediction target is topic utterance, since the dialogue scene "inquiry understanding" is defined as a dialogue scene that includes topic utterances, the sort unit 11 extracts utterances of the "inquiry understanding" dialogue scene as targets for generation of learning data. With respect to each of the extracted utterances, for example, training data indicating whether it is a topic utterance or whether it is not a topic utterance is appended by workers, and the learning data is generated. Further, as the dialogue scene "response" is defined as a dialogue scene that includes utterances similar to topic utterances, the sort unit 11 excludes, from targets for generation of learning data, utterances of the dialogue scene "response". Further, as the dialogue scene "contract confirmation" is defined as a dialogue scene that does not include utterances similar to topic utterances, the sort unit 11 appends, to the utterances of the dialogue scene "contract confirmation", training data indicating that they are not topic utterances and generates learning data. Moreover, the sort unit 11 may exclude utterances of the dialogue scene "contract confirmation" from the targets for generation of learning data.

The learning target definition for each utterance type as explained above are, for example, defined by workers beforehand and are retained in the sort unit 11.

Further, the sort unit 11 computes the degree of similarity between utterances of dialogue scenes that include utterances of utterance types that are prediction targets and utterances of other dialogue scenes, and utterances of dialogue scenes that include utterances similar to utterances of dialogue scenes that include utterances of utterance types that are prediction targets may be excluded from the targets for generation of learning data. For example, in a case in which the utterance type of the prediction target is topic utterance, the sort unit 11 may compute the degree of similarity between utterances of the dialogue scene "inquiry understanding" defined as a dialogue scene that includes topic utterances and utterances of other dialogue scenes, and may exclude, for example, utterances of dialogue scenes that include utterances having a degree of similarity greater than or equal to a prescribed value, from the targets for generation of learning data.

Next, a learning data generation method performed by the learning data generation device 10 of the present embodiment is explained using an example in which learning data is generated for the creation of a prediction model for topic utterances. First, as is conventional, a case in which training data is appended by a worker in respect of utterances in a dialog is explained as an example.

Hereinafter, as shown in FIG. 3, it shall be assumed that utterances #11 to #22 have been made in a dialog between a customer and a service person. In FIG. 3, utterances #11, #13, #14, #16, #18, and #21 are shown as utterances of the customer, and utterances #12, #15, #17, #19, #20, and #22 are shown as utterances of the service person. Further, each of the speech balloons indicates a unit of the speech recognition results.

The dialog between the customer and the service person shown in FIG. 3 concerns an auto insurance policy that the customer is enrolled in. More specifically, according to utterances #11 to #16, inquiry content acquisition for a change to the contract content of the auto insurance policy is performed, according to utterances #17 to #19 confirmation relating to a customer contract is performed, and according to utterances #20 to #22 a response to the customer inquiry (change to the contract content of the auto insurance policy) is performed. Here, it is assumed that, according to utterances #11 and #21, similar utterances were made ("I would like to change my auto insurance policy please.").

In a case in which training data is appended to each of the utterances by a worker, the worker, on the basis of the content of the respective utterances and the preceding and succeeding contexts and the like, determines whether the respective utterances correspond to topic utterances, and appends training data. In the example of FIG. 3, utterances #11 and #12 concern the topic of the dialog between the customer and the service person that concerns "a change to the contract content of an auto insurance policy". Thus, with respect to utterances #11 and #12, training data indicating these are topic utterances, i.e. a positive sample, is appended. Further, utterances #13 to #22 are utterances for inquiry content confirmation, contract content confirmation, inquiry response and the like. Thus, with respect to utterances #13 to #22, training data indicating that these are not topic utterances, i.e. negative samples, is appended.

Here, in a case in which the appending of training data is done manually, as explained above, the utterance types are determined on the basis of the content of each utterance, preceding and succeeding context, and the like. Thus, according to the similar utterances #11 and #21, learning data to which differing training data is appended may be generated. Should a prediction model be created using such learning data, prediction accuracy would be reduced.

Next, a learning data generation method in the learning data generation device 10 according to the present embodiment will be described with reference to FIG. 4. Moreover, in FIG. 4, the sort unit 11 performs sorting in accordance with the definitions shown in FIG. 2. Further, in FIG. 4, as is similar to FIG. 3, it is assumed that utterances #11 to #22 have been made.

As discussed above, according to utterances #11 to #16 acquisition of customer inquiry content concerning a change to contract content of an auto insurance policy is performed, according to utterances #17 to #19 confirmation relating to the customer contract is performed, and according to utterances #20 to #22 the response to the customer inquiry (a change to the contract content of the auto insurance policy) is performed. Thus, the dialogue scene of utterances #11 to #16 is "inquiry understanding", the dialogue scene of utterances #17 to #19 is "contract confirmation", and the dialogue scene of utterances #20 to #22 is "response". The utterances #11 to #22 to which information indicating the dialogue scene is appended is inputted into the sort unit 11.

The learning data generation method according to the present embodiment includes a sorting step in which the sort unit 11 sorts whether utterances are to be targets for generation of learning data. Specifically, because "inquiry understanding" is defined as a dialogue scene including topic utterances as shown in FIG. 2, the sort unit 11 extracts utterances #11 to #16 as targets for the generation of learning data. With respect to extracted utterances #11 to #16, training data pertaining to whether the utterance is a topic utterance is appended by, for example, a worker. As explained above, utterances #11 and #12 concern the topic of the dialog between the customer and the service person, that concerns "a change to the contract content of an auto insurance contract policy". Thus, with respect to utterances #11 and #12, learning data to which training data indicating that the utterances are topic utterances, i.e. positive samples, is appended. Further, with respect to utterances #13 to #16, learning data to which training data indicating that the utterances are not topic utterances, i.e. negative samples, is appended.

Further, because "contract confirmation" is defined as a dialogue scene that does not include utterances similar to topic utterances as shown in FIG. 2, the sort unit 11 generates, with respect to utterances #17 to #19 of the dialogue scene "contract confirmation", learning data to which training data that indicates that the utterances are not topic utterances, i.e. negative samples, is appended.

Further, because "response" is defined a dialogue scene that includes utterances similar to topic utterances as shown in FIG. 2, the sort unit 11 excludes utterances #20 to #22 of the dialogue scene "response" from the learning data. As has been shown, by excluding, from the targets for generation of learning data, utterances for the dialogue scenes that include (possibly include) utterances similar to the utterances of utterance types to be targeted for prediction, utterance #12 that is similar to utterance #11 that itself is a topic utterance, is excluded from the targets for generation of the learning data. As a result, learning data to which different training data is appended for similar utterances is no longer be generated, and the prediction accuracy of the prediction model created using such learning data can be improved. Further, the sort unit 11 may, using the sort prediction model that has in advance undergone learning in accordance with the definitions of FIG. 2, with respect to utterances, the dialogue scenes of utterances, and utterance type inputs, generate learning data as training data (positive samples/negative samples) for utterance types corresponding to the definitions.

Figure 5:
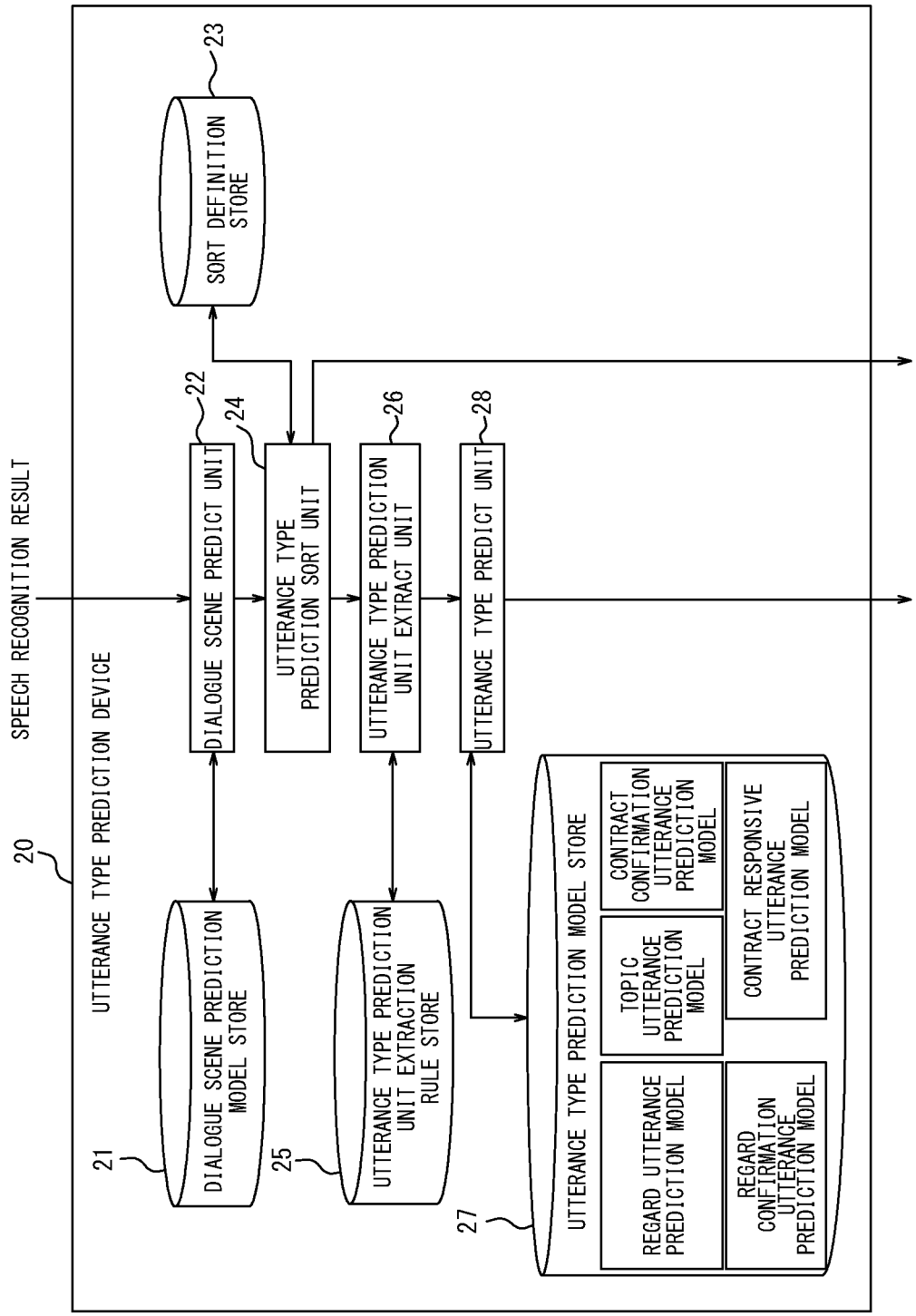
FIG. 5 is a diagram illustrating an example configuration of an utterance type prediction device that predicts utterance type with the prediction model.

Next, referring to FIG. 5, explanation regarding an utterance type prediction device 20 is given, wherein the utterance type prediction device 20 prediction utterance type by using a prediction a prediction model created using learning data generated by the learning data generation device 10. FIG. 5 is a diagram illustrating an example configuration of the utterance type prediction device 20.

The utterance type prediction device 20 shown in FIG. 5 comprises a dialogue scenes prediction model store 21, a dialogue scene predict unit 22, a sort definition store 23, an utterance type prediction sort unit 24, an utterance type prediction unit extraction rule store 25, an utterance type prediction unit extract unit 26, an utterance type prediction model store 27, and an utterance type predict unit 28.

The dialogue scene prediction model store 21 stores dialogue scene prediction models generated by performing learning on the correspondence between utterances and dialogue scenes. The learning may employ, for example, a support vector machine (SVM), a deep neural network (DNN) and the like.

The speech recognition result for utterances in a dialog amongst more than one speaker is inputted into the dialogue scene predict unit 22. For example, the abovementioned speech recognition result units are inputted into the dialogue scene predict unit 22. Further, in a case in which end-of-talk determination is performed on the speech recognition result, end-of-talk unit utterances may be inputted into the dialogue scene predict unit 22. The dialogue scene predict unit 22 predicts, by using the dialogue scene prediction model stored in the dialogue scene prediction model store 21, the dialogue scene of the utterances corresponding to the speech recognition results. The dialogue scene predict unit 22 outputs the utterances and the dialogue scenes of such utterances to the utterance type prediction sort unit 24.

The sort definition store 23 stores the sort definitions for performing sorting, on the basis of the dialogue scenes of the utterances, regarding whether those utterances are to be targeted for utterance type prediction using the prediction model.

FIG. 6 is diagram illustrating example sort definitions stored by the sort definition store 23.

The sort definition store 23, as shown in FIG. 6, stores sorting definitions that interrelate utterance types, dialogue scenes that are targets for prediction, and dialogue scenes that are not targets for prediction. A dialogue scene of a prediction target is a dialogue scene that is utilized in the learning data as a positive or negative sample. A dialogue scene that is not a prediction target is a dialogue scene that is utilized in the learning data as a negative sample or one that is excluded from the learning target.

According to the example shown in FIG. 6, for example, the utterance type "topic utterance", the dialogue scene targeted for prediction "inquiry understanding", and the dialogue scene not targeted for prediction "response", "contract confirmation" "opening", and "closing", are associated in the sort definitions. Sort definitions are, for example, generated based on the learning target definitions used during learning. Among the learning target definitions in the sort definitions, dialogue scenes that include positive and negative samples in relation to learning data are deemed to be dialogue scenes subjected to prediction. Among the learning target definitions in the sort definitions, dialogue scenes that solely include negative samples in the learning data are deemed to be dialogue scenes not subjected to prediction. For example, when prediction is to be made with respect to whether the utterance type of an utterance is "topic utterance", utterances for which the dialogue scene is "inquiry understanding" are targeted for prediction because these contain positive and negative samples in the learning data; however, utterances for which the dialogue scene is "contract confirmation", "response", "opening", or "closing" are not targeted for prediction because these solely contain negative samples in the learning data.

Referring again to FIG. 5, the utterance type prediction sort unit 24, based on the dialogue scene of the utterance outputted by the dialogue scene predict unit 22, uses the sort definitions stored in the sort definition store 23 to predict whether that utterance is to be subjected to utterance type prediction using the prediction model described hereafter. Specifically, when the dialogue scene of the utterance is a dialogue scene prediction target, the utterance type prediction sort unit 24 deems that utterance to be an utterance type prediction target and outputs that utterance to the utterance type prediction unit extract unit 26. Further, when the dialogue scene of the utterance is a dialogue scene is not a prediction target, the utterance type prediction sort unit 24 excludes that utterance from the utterance type prediction targets. In this case, the utterance type prediction sort unit 24 outputs the prediction result that that utterance is not an utterance of the utterance prediction target.

The utterance type prediction unit extraction rule store 25 stores rules for extracting units for predicting utterance types from text-converted utterances. For example, the utterance type prediction unit extraction rule store 25 can store an extraction rule for extracting up to a period or a final character in an utterance, as a single unit.

The utterance type prediction unit extract unit 26 extracts, in accordance with rules stored in the utterance type prediction unit extraction rule store 25, utterances of units for predicting utterance types from utterances targeted for utterance type prediction that have been outputted from the utterance type prediction sort unit 24. Specifically, the utterance type prediction unit extract unit 26 extracts utterances, in accordance with, for example, a rule in which text-converted utterances outputted from the utterance type prediction sort unit 24 are extracted up to a punctuation mark or a final character in the speech recognition result unit, as a single unit. The utterance type prediction unit extract unit 26 outputs the utterances of the extracted utterance type prediction unit to the utterance type predict unit 28.

The utterance type prediction model store 27 stores prediction models for the utterance types created using learning data generated by the learning data generation device 10. The utterance type prediction model store 27 stores, for example, a topic utterance prediction model for prediction whether the utterance type of an utterance is topic utterance, a regard utterance prediction model for predicting whether the utterance type of an utterance is regard utterance, a regard confirmation utterance prediction model for predicting whether the utterance type of an utterances is regard confirmation utterance, a contract confirmation utterance prediction model for predicting whether the utterance type of an utterance is contract confirmation utterance, a contract responsive utterance prediction model for predicting whether the utterance type of an utterance is contract responsive utterance, and the like.

The utterance type predict unit 28 predicts, using the prediction model of the utterance type of the prediction target stored in the utterance type prediction model store 27, whether an utterance corresponding to an utterance type prediction unit outputted by the utterance type prediction unit extract unit 26 is an utterance of the utterance type of the prediction target, and outputs a prediction result. For example, when the utterance type of the prediction target is topic utterance, the utterance type predict unit 28, using the topic utterance prediction model stored in the utterance type prediction model store 27, predicts whether an utterance corresponding to an utterance type prediction unit outputted by the utterance type prediction unit extract unit 26 is a topic utterance.

Further, the utterance type predict unit 28 may predict, in accordance with the dialogue scene predicted by the dialogue scene predict unit 22, the utterance type of an utterance corresponding to an utterance type prediction unit outputted by the utterance type prediction unit extractor 18. Specifically, the utterance type predict unit 28 may predict utterance types for each dialogue scene, using the respective prediction models stored in the utterance type prediction model store 27.

Figure 8:
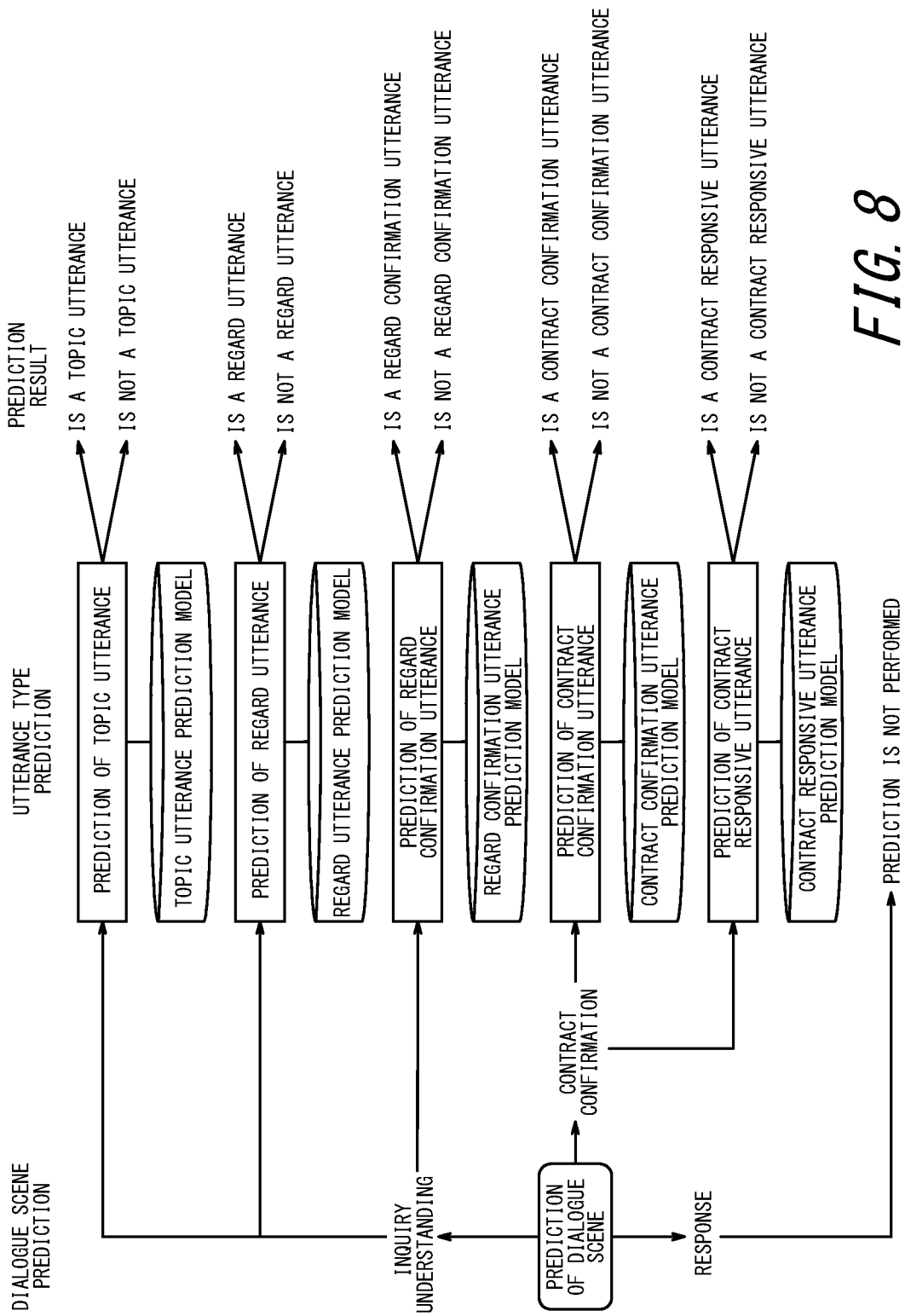
FIG. 8 is a diagram for explaining prediction of utterance type by the utterance type prediction device of FIG. 5.

For example, the utterance type predict unit 28 stores, as shown in FIG. 7, for each dialogue scene, utterance type definitions as the prediction targets of utterances of that dialogue scene. Then, the utterance type predict unit 28 may, based on the dialogue scene of an utterance predicted by the dialogue scene predict unit 22, predict whether that utterance corresponds to an utterance of utterance type corresponding to the dialogue scene. For example, when the utterance dialogue scene is "inquiry understanding", the utterance type predict unit 28, based on the definitions shown in FIG. 7, and as shown in FIG. 8, predicts the utterance type of an utterance corresponding to an utterance type prediction unit outputted by utterance type prediction unit extract unit 26, using the topic utterance prediction model, the regard utterance prediction model, and the regard confirmation utterance prediction model. Specifically, the utterance type predict unit 28 predicts, using the topic utterance prediction model, whether the utterance type of the utterance corresponding to the utterance type prediction unit is topic utterance. Further, the utterance type predict unit 28 predicts, using the regard utterance prediction model, whether the utterance type of the utterance type of the utterance corresponding to the utterance type prediction unit is regard utterance. Further, the utterance type predict unit 28 predicts, using the regard confirmation utterance prediction model, whether the utterance type of the utterance type of the utterance corresponding to the utterance type prediction unit is regard confirmation utterance.

Further, when the utterance dialogue scene is "contract confirmation" the utterance type predict unit 28, based on the definitions shown in FIG. 7, and as shown in FIG. 8, predicts the utterance type of an utterance corresponding to an utterance type prediction unit outputted by the utterance type prediction unit extract unit 26, using the contract confirmation utterance prediction model and the contract responsive utterance prediction model. Specifically, the utterance type predict unit 28 predicts, using the contract confirmation utterance prediction model, whether the utterance type of the utterance corresponding to the utterance type prediction unit is contract confirmation utterance. Further, the utterance type predict unit 28 predicts, using the contract responsive utterance estimation model, whether the utterance type of the utterance corresponding to the utterance type prediction unit is contract responsive utterance.

Further, when the utterance dialogue scene is "response", the utterance type predict unit 28 does not perform prediction of the utterance type of that utterance, in accordance with the definitions shown in FIG. 7, as shown in FIG. 8.

When the dialogue scene is not predicted and utterance type prediction is to be performed for all utterances, wrong prediction results may occur. This kind of situation will be explained with reference to FIG. 9. In FIG. 9, in a manner similar to FIG. 3, it is assumed that utterances #11 to #22 of the customer and the service person utterances have been made. Further, in FIG. 9, an example of prediction of topic utterances will be explained.

When utterance type prediction is to be performed without performing dialogue scene prediction, for utterances #11 to #22, prediction is performed to determine whether the utterances are topic utterances. As mentioned above, utterances #11 and #12 are topic utterances. Thus, as shown in FIG. 9, it is assumed that utterances #11 and #12 are predicted as topic utterances. Utterances #11 and #21 are similar. Utterance #21 is an utterance during a response to an inquiry of the customer, and is not a topic utterance. However, because utterance #21 is similar to utterance #11 which itself is a topic utterance, utterance #21 may be wrongly predicted to be a topic utterance.

On the other hand, with respect to the utterance type prediction device 20 shown in FIG. 5, as shown in FIG. 10, dialogue scene prediction is performed on each of utterances #11 to #22. Further, because the dialogue scene "inquiry understanding" is a target for prediction of topic utterances (see, FIG. 6), for utterances #11 through #16 of the dialogue scene "inquiry understanding", prediction as to whether it is a topic utterance is performed using the topic utterance prediction model. In the present embodiment, since the learning data is generated with care being taken so as to not append differing training data to similar utterances, by way of the topic utterance prediction model, high accuracy prediction as to whether utterances #11 to #16 are topic utterances may be performed. Further, with respect to utterances of dialogue scenes other than the dialogue scene "inquiry understanding" (i.e. "contract confirmation" and "response"), prediction using the topic utterance prediction model is not performed and it is predicted that those utterances are not topic utterances. Thus, utterance #21 belonging to the dialogue scene "response" is correctly predicted not to be a topic utterance.

In this manner, in the present embodiment, the learning data generation device 10 comprises a sort unit 11 for performing, based on a dialogue scene appended to an utterance in a dialog between more than one speaker, sorting as to whether the utterance is a target for generation of learning data generation. The sort unit 11 excludes utterances of a dialogue scene that includes utterances similar to utterances of particular types from the targets for generation of learning data.

By doing so, generation of learning data to which differing training data is appended for utterances of a particular type and utterances similar to those utterances of a particular type, is avoided. As a result, the prediction accuracy of a prediction model created using such learning data can be improved.

The learning data generation device 10 has been explained above but it should be noted that, in order to function as the learning data generation device 10, a computer may also be used. Such a computer may be realized by causing the CPU of the computer to read out and execute a program that defines procedures for realizing the respective functions of the learning data generation device 10 and is stored on a memory of the computer.

Further, the program may be recorded on a computer readable recording medium. By using such a recording medium, the program can be installed on a computer. Here, the recording medium on which the program is recorded may be a non-transitory recording medium. Though the non-transitory recording medium is not particularly limited, it may, for example, be a recording medium such as a CD-ROM and/or a DVD-ROM etc.

Although the above embodiments have been described as typical examples, it will be evident to skilled person that many modifications and substitutions are possible within the spirit and scope of the present invention. Therefore, the present invention should not be construed as being limited by the above embodiments, and various changes and modifications and the like can be made without departing from the claims. For example, it is possible to combine a plurality of constituent blocks described in the configuration diagram of the embodiment into one, or to divide one constituent block.

REFERENCE SIGNS LIST 10 learning data generation device
11 sort unit
20 utterance type prediction device
21 dialogue scene prediction model store
22 dialogue scene predict unit
23 sort definition store
24 utterance type prediction sort unit
25 utterance type prediction unit extraction rule store 26 utterance type prediction unit extract unit
27 utterance type prediction model store
28 utterance type predict unit

The invention claimed is:

1. A learning data generation device for generating learning data for training of a machine learning model for predicting an utterance type of an utterance, the learning data generation device comprising:
a memory configured to store predetermined sorting definition data prescribing:
dialogue scenes that include utterances of the utterance type to be predicted;
dialogue scenes that include utterances similar to utterances of the utterance type to be predicted; and
dialogue scenes that do not include utterances similar to utterances of the utterance type to be predicted; and
a processor configured to:
retrieve utterance data including a plurality of utterance, utterance type of the plurality of utterances, and dialogue scene associated with the plurality of utterances;
automatically sort the retrieved utterance data, based on the utterance types and the dialogue scene included in the retrieved utterance data, according to whether the dialogue scene included in the retrieved utterance data is included in the dialogue scenes that do not include utterances similar to utterances of the utterance type to be predicted prescribed in the predetermined sorting definition data stored in the memory, thereby exclude the retrieved utterance data from the targets for generation of the learning data when the dialogue scene included in the retrieved utterance data is included in the dialogue scenes that do not include utterances similar to utterances of the utterance type to be predicted prescribed; and
generate, based on the sorted utterance data, the learning data for use in the training of the machine learning model.

2. The learning data generation device according to claim 1,
wherein the processor is further configured to extract utterances of a dialogue scene that includes utterances of the particular type as targets for generation of the learning data.

3. The learning data generation device according to claim 2,
wherein the processor is further configured to generate, with respect to utterances of a dialogue scene that does not include utterances similar to utterances of the particular type, learning data to which training data indicating that the utterances are not utterances of the particular type is appended.

4. The learning data generation device according to claim 2,
wherein the processor is further configured to retain a pre-stipulated definition of dialogue scenes including:
utterances of the particular type,
dialogue scenes including utterances similar to utterances of the particular type, and
dialogue scenes not including utterances similar to utterances of the particular type, and
perform sorting in accordance with the definition.

5. The learning data generation device according to claim 2,
wherein the processor is further configured to compute a degree of similarity between an utterance of a dialogue scene and an utterance of another dialogue scene, wherein the utterance of the dialogue scene includes utterances of the particular type and the utterance of the dialogue scene excludes utterances of a dialogue scene that includes utterances that are similar to utterances of the dialogue scene that includes utterances of the particular type from the targets for generation of the learning data.

6. The learning data generation device according to claim 1,
wherein the processor is further configured to generate, with respect to utterances of a dialogue scene that does not include utterances similar to utterances of the particular type, learning data to which training data indicating that the utterances are not utterances of the particular type is appended.

7. The learning data generation device according to claim 6,
wherein the processor is further configured to retain a pre-stipulated definition of dialogue scenes including:
utterances of the particular type,
dialogue scenes including utterances similar to utterances of the particular type, and
dialogue scenes not including utterances similar to utterances of the particular type, and
perform sorting in accordance with the definition.

8. The learning data generation device according to claim 6, wherein the processor is further configured to:
compute a degree of similarity between an utterance of a dialogue scene and an utterance of another dialogue scene, and wherein the utterance of the dialogue scene includes utterances of the particular type, and the utterance of the dialogue scene excludes utterances of a dialogue scene that includes utterances that are similar to utterances of the dialogue scene that includes utterances of the particular type from the targets for generation of the learning data.

9. The learning data generation device according claim 1, wherein the processor is further configured to:
retain a pre-stipulated definition of dialogue scenes including:

utterances of the particular type,
dialogue scenes including utterances similar to utterances of the particular type, and
dialogue scenes not including utterances similar to utterances of the particular type, and
perform sorting in accordance with the definition.

10. The learning data generation device according to claim 1,
wherein the processor further configured to compute a degree of similarity between an utterance of a dialogue scene and an utterance of another dialogue, and
wherein the utterance of the dialogue scene includes utterances of the particular type and the utterance of the dialogue scene excludes utterances of a dialogue scene that includes utterances that are similar to utterances of the dialogue scene that includes utterances of the particular type from the targets for generation of the learning data.

11. A non-transitory computer readable recording medium recording a program for causing a computer to function as the learning data generation device according to claim 1.

12. A learning data generation method in a learning data generation device for generating learning data for training of a machine learning model for predicting an utterance type of an utterance, the learning data generation method comprising:
automatically sorting the retrieved utterance data, based on the utterance types and the dialogue scene included in the retrieved utterance data, according to whether the dialogue scene included in the retrieved utterance data is included in the dialogue scenes that do not include utterances similar to utterances of the utterance type to be predicted prescribed in the predetermined sorting definition data stored in the memory, thereby excluding the retrieved utterance data from the targets for generation of the learning data when the dialogue scene included in the retrieved utterance data is included in the dialogue scenes that do not include utterances similar to utterances of the utterance type to be predicted prescribed,
wherein the memory is configured to store predetermined sorting definition data prescribing:
dialogue scenes that include utterances of the utterance type to be predicted,
dialogue scenes that include utterances similar to utterances of the utterance type to be predicted, and
dialogue scenes that do not include utterances similar to utterances of the utterance type to be predicted; and
generate, based on the sorted utterance data, the learning data for use in the training of the machine learning model.

* * * * *